United States Patent
Zhou

(10) Patent No.: US 11,383,343 B2
(45) Date of Patent: Jul. 12, 2022

(54) DEVICE FOR REMOVING BURRS FROM ALUMINUM ALLOY HUB

(71) Applicant: CITIC DICASTAL CO., LTD, Hebei (CN)

(72) Inventor: Ruixiao Zhou, Hebei (CN)

(73) Assignee: CITIC DICASTAL CO., LTD., Qinhuangdao (CN)

( * ) Notice: Subject to any disclaimer, the term of this patent is extended or adjusted under 35 U.S.C. 154(b) by 693 days.

(21) Appl. No.: 16/362,180

(22) Filed: Mar. 22, 2019

(65) Prior Publication Data
US 2019/0329372 A1 Oct. 31, 2019

(30) Foreign Application Priority Data
Mar. 29, 2018 (CN) .......................... 201810272080.4

(51) Int. Cl.
| | | |
|---|---|---|
| B24B 9/04 | (2006.01) | |
| B24B 5/44 | (2006.01) | |
| B24B 19/28 | (2006.01) | |
| B24B 29/04 | (2006.01) | |
| B24B 41/06 | (2012.01) | |

(Continued)

(52) U.S. Cl.
CPC .................. B24B 9/04 (2013.01); B24B 5/44 (2013.01); B24B 19/28 (2013.01); B24B 27/0046 (2013.01); B24B 29/005 (2013.01); B24B 29/04 (2013.01); B24B 41/005 (2013.01); B24B 41/06 (2013.01); B24B 49/003 (2013.01); B60B 2310/234 (2013.01); B60B 2310/60 (2013.01); B60B 2360/104 (2013.01)

(58) Field of Classification Search
CPC .... B24B 5/44; B24B 9/02; B24B 9/04; B24B 19/28; B24B 27/0046; B24B 29/005; B24B 29/04; B24B 41/005; B24B 41/02; B24B 41/06; B24B 41/067; B24B 49/003; B24B 49/10; B23D 79/04; B60B 2310/234; B60B 2310/60; B60B 2310/612
USPC ............................................ 451/59, 119, 254
See application file for complete search history.

(56) References Cited

U.S. PATENT DOCUMENTS 5,161,281 A * 11/1992 Hanen ...................... B08B 1/04
  15/88.3
6,330,837 B1 * 12/2001 Charles .................... B25J 11/00
  74/490.06

(Continued)

*Primary Examiner* — Eileen P Morgan
(74) *Attorney, Agent, or Firm* — IPRO, PLLC

(57) ABSTRACT

Disclosed is a device for removing burrs from an aluminum alloy hub. The device includes a workbench, columns, a brush, a spindle, a spindle box, a cross beam, a spindle motor, a controller, a parallel robot, and a displacement sensor. Columns are fixedly connected to the workbench, and the cross beam is connected to the columns and a position of the cross beam can be adjusted along the columns; the spindle box is connected to the cross beam, and moves horizontally on the cross beam; the spindle, the spindle motor and the controller are mounted on the spindle box, and the brush is mounted at the end of the spindle; the brush is driven to rotate by the spindle motor and controlled by the controller; and the displacement sensor is mounted in the brush. The parallel robot can implement precise adjustment, and can perform real-time posture adjustment according to the instruction of the controller to ensure that the brush is always in close contact with the back cavity of the hub.

5 Claims, 1 Drawing Sheet

(51) Int. Cl.
*B24B 49/00* (2012.01)
*B24B 29/00* (2006.01)
*B24B 41/00* (2006.01)
*B24B 27/00* (2006.01)

(56) References Cited

U.S. PATENT DOCUMENTS

| | | | |
|---|---|---|---|
| 7,351,130 B1 * | 4/2008 | Chang | B24B 7/06 |
| | | | 451/11 |
| 10,022,834 B2 * | 7/2018 | Xue | B24B 29/005 |
| 10,112,282 B2 * | 10/2018 | Xue | B24B 9/04 |
| 10,137,379 B2 * | 11/2018 | Wach | A63G 31/16 |
| 10,160,051 B2 * | 12/2018 | Xue | B23D 79/04 |
| 10,220,485 B2 * | 3/2019 | Xue | B24B 29/005 |
| 10,239,181 B2 * | 3/2019 | Xue | B24B 41/06 |
| 10,265,823 B2 * | 4/2019 | Xue | B24B 41/067 |
| 10,603,763 B2 * | 3/2020 | Liu | B24B 5/44 |
| 10,737,364 B2 * | 8/2020 | Xue | B24B 27/0076 |
| 10,766,115 B2 * | 9/2020 | Xue | B24B 47/12 |
| 10,780,545 B2 * | 9/2020 | Liu | B24B 41/06 |

* cited by examiner

DEVICE FOR REMOVING BURRS FROM ALUMINUM ALLOY HUB

CROSS REFERENCE TO RELATED APPLICATION

This application claims priority to Chinese Patent Application No. 201810272080.4, entitled "DEVICE FOR REMOVING BURRS FROM ALUMINUM ALLOY WHEEL" and filed on Mar. 29, 2018, which is incorporated herein by reference for all purposes.

FIELD OF THE INVENTION

The present invention relates to the field of aluminum alloy hub manufacturing, in particular to a self-adaptive hub burr removing device.

BACKGROUND OF THE INVENTION

Many burrs are inevitably generated in the machining process of an automotive aluminum alloy hub. These burrs not only affect the attractiveness, but also affect the subsequent coating effect, especially with significant effect on the corrosion requirements. Due to the various shapes of the back cavity of the hub, it is more difficult to remove the burrs at the back cavity of the hub than in other positions. Since the angle between the brush and the back cavity is fixed and unadjustable, the conventional burr removing method cannot adapt to the shape of the back cavity of the hub, and is low in burr removing precision and efficiency. Therefore, it is urgent to develop a self-adaptive hub burr removing device with simple structure and good effect.

SUMMARY OF THE INVENTION

The aim of the present invention is to provide a self-adaptive hub burr removing device in accordance with the deficiencies of the burr removing method mentioned above.

In one aspect of the present invention, provided is a device for removing burrs from an aluminum alloy hub, the device comprises a workbench, columns, a brush, a spindle, a spindle box, a cross beam, a spindle motor, a controller, a clamp, a parallel robot, and a displacement sensor, the columns are fixedly connected to the workbench, and the cross beam is connected to the columns and the position of the cross beam can be adjusted along the columns; the spindle box is connected to the cross beam, and moves horizontally on the cross beam; the spindle, the spindle motor and the controller are mounted on the spindle box, and the brush is mounted at the end of the spindle; the brush is driven to rotate by the spindle motor and controlled by the controller; the displacement sensor is mounted in the brush; and the parallel robot is mounted at the bottom of the workbench; and the clamp is fixed on the parallel robot, and the aluminum alloy hub is fixed to the parallel robot by the clamp; and the parallel robot is capable of performing real-time posture adjustment on the aluminum alloy hub according to the instruction of the controller to ensure that the brush is always in close contact with back cavity of the aluminum alloy hub, thereby achieving a good burr removing effect.

More than three displacement sensors are arranged in the brush and are ultrasonic displacement sensors.

The parallel robot is a Stewart parallel platform.

The parallel robot is arranged to drive the aluminum alloy hub to tile relative to the horizontal plane in a range of 0 degree to 30 degrees.

The parallel robot drives the hub to rotate relative to the horizontal plane.

The cross beam is connected to the columns by bolts or guide rails.

The present invention adjusts the position and angle of the hub in real time through a displacement closed-loop control system to ensure that the brush is always in close contact with the back cavity of the hub, thereby achieving a good burr removing effect with the advantage of high automation, simple structure, high efficiency, saving manpower, etc., especially suitable for large-batch hub production sites. The displacement sensor can feed back position information of the surface of a hub approaching thereto in real time. The hub 9 is fixed to the parallel robot by the clamp. The parallel robot can implement precise adjustment, and can perform real-time posture adjustment according to the instruction of the controller to ensure that the brush is always in close contact with the back cavity of the hub, thereby achieving a good burr removing effect.

BRIEF DESCRIPTION OF THE DRAWINGS

The technical solution of the present invention is described as follows with reference to the drawings.

In which, 1 workbench, 2 column, 3 brush, 4 spindle, 5 spindle box, 6 cross beam, 7 spindle motor, 8 controller, 9 hub, 10 clamp, 11 parallel robot, 12 displacement sensor.

DETAILED DESCRIPTION OF EMBODIMENTS

Embodiment 1

The present invention is further illustrated as follows in combination with the drawings and specific embodiments.

Figure 1:
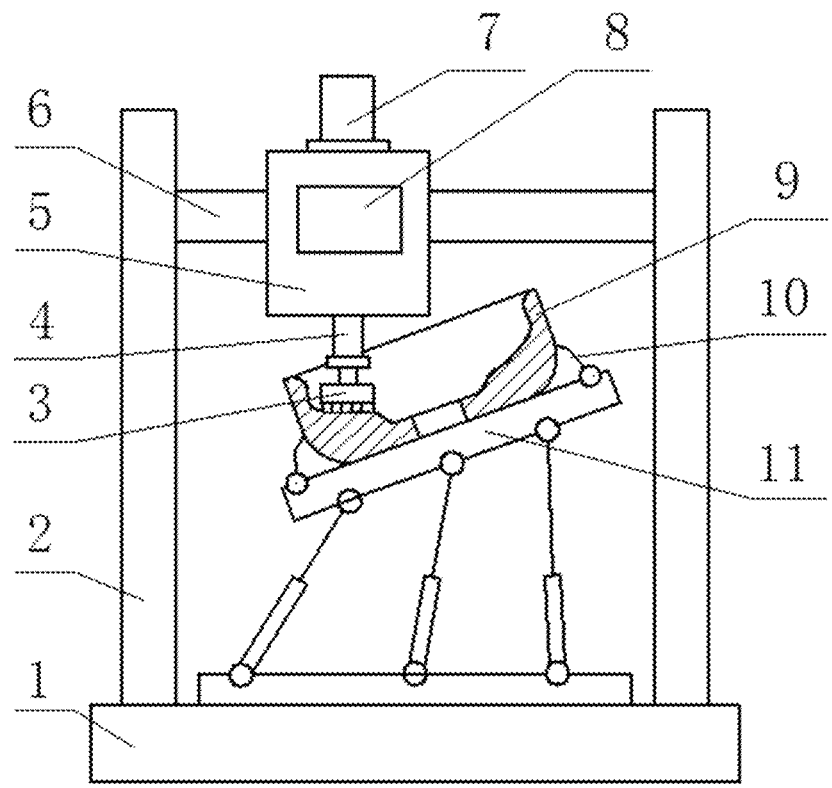
FIG. 1 is an overall structure diagram of a self-hub burr removing device.
Figure 2:
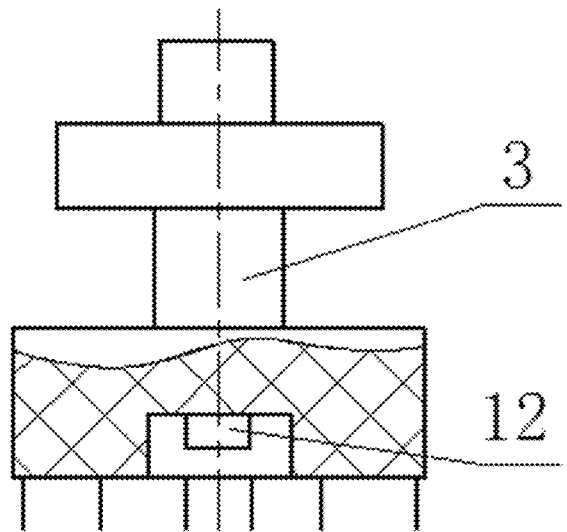
FIG. 2 is a partial cross-sectional view of a brush.

As shown in FIG. 1 and FIG. 2, the self-adaptive hub burr removing device according to the present invention is composed of a workbench 1, columns 2, a brush 3, a spindle 4, a spindle box 5, a cross beam 6, a spindle motor 7, a controller 8, a clamp 10, a parallel robot 11, a displacement sensor 12 and other components. The columns 2 are fixedly connected to the workbench 1, the cross beam 6 is connected to the columns 2 by bolts or guide rails, and the position of the cross beam 6 is adjustable along the columns 2. The spindle box 5 is connected to the cross beam 6, and can translate on the cross beam 6. The spindle 4, the spindle motor 7 and the controller 8 are arranged on the spindle box 5. The brush 3 is connected to the end of the spindle 4. The displacement sensor 12 is arranged inside the brush 3, and the specific type and quantity of the displacement sensor 12 can be selected according to actual needs. The displacement sensor 12 can feed back position information of the surface of a hub 9 approaching thereto in real time. The hub 9 is fixed to the parallel robot 11 by the clamp 10. The parallel robot 11 can implement precise adjustment, and can perform real-time posture adjustment according to the instruction of the controller 8 to ensure that the brush 3 is always in close contact with the back cavity of the hub, thereby achieving a good burr removing effect.

The invention claimed is:
1. A device for removing burrs from an aluminum alloy hub, characterized in that the device comprises a workbench, columns, a brush, a spindle, a spindle box, a cross beam, a spindle motor, a controller, a clamp, a parallel robot and a displacement sensor, wherein the columns are fixedly connected to the workbench, and the cross beam is connected to the columns and a position of the cross beam can be adjusted along the columns;

the spindle box is connected to the cross beam, and moves horizontally on the cross beam;

the spindle, the spindle motor and the controller are mounted on the spindle box, and the brush is mounted at the end of the spindle;

the brush is driven to rotate by the spindle motor and controlled by the controller;

the displacement sensor is mounted in the brush, and is capable of feeding back position information of surface of the aluminum alloy hub approaching thereto in real time;

the parallel robot is mounted at a bottom of the workbench;

the clamp is fixed on the parallel robot, and the aluminum alloy hub is fixed to the parallel robot by the clamp; and the parallel robot is capable of performing real-time posture adjustment on the aluminum alloy hub according to the instruction of the controller to ensure that the brush is always in close contact with back cavity of the aluminum alloy hub.

2. The device for removing burrs from an aluminum alloy hub according to claim 1, characterized in that more than three displacement sensors are arranged in the brush and are ultrasonic displacement sensors.

3. The device for removing burrs from an aluminum alloy hub according to claim 1, characterized in that the parallel robot is a Stewart parallel platform.

4. The device for removing burrs from an aluminum alloy hub according to claim 1, characterized in that the parallel robot is arranged to drive the aluminum alloy hub to tilt relative to a horizontal plane in a range of 0 degree to 30 degrees.

5. The device for removing burrs from an aluminum alloy hub according to claim 1, characterized in that the cross beam is connected to the columns by bolts or guide rails.

* * * * *